US010862732B2

(12) United States Patent
Garg et al.

(10) Patent No.: US 10,862,732 B2
(45) Date of Patent: *Dec. 8, 2020

(54) ENHANCED NETWORK VIRTUALIZATION USING METADATA IN ENCAPSULATION HEADER

(71) Applicant: Microsoft Technology Licensing, LLC, Redmond, WA (US)

(72) Inventors: Pankaj Garg, Bellevue, WA (US); Andrew J. Ritz, Sammamish, WA (US); Stephen E. Bensley, Bellevue, WA (US); Praveen Balasubramanian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

This patent is subject to a terminal disclaimer.

(21) Appl. No.: 16/269,492

(22) Filed: Feb. 6, 2019

(65) Prior Publication Data

US 2019/0190770 A1    Jun. 20, 2019

Related U.S. Application Data

(63) Continuation of application No. 14/026,759, filed on Sep. 13, 2013, now Pat. No. 10,212,022.

(51) Int. Cl.
*H04L 12/24* (2006.01)
*H04L 12/46* (2006.01)

(52) U.S. Cl.
CPC .......... *H04L 41/00* (2013.01); *H04L 12/4633* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 7,899,048 B1* | 3/2011 | Walker | H04L 43/18 370/390 |
| 2013/0054761 A1* | 2/2013 | Kempf | H04L 47/781 709/220 |
| 2013/0107887 A1* | 5/2013 | Pearson | H04L 45/64 370/401 |
| 2014/0207968 A1* | 7/2014 | Kumar | H04L 45/64 709/244 |
| 2016/0173373 A1* | 6/2016 | Guichard | H04L 45/74 370/392 |

OTHER PUBLICATIONS

"Second Office Action Issued in Chinese Patent Application No. 201480050580.3", dated Feb. 11, 2019, 8 Pages.
"Office Action Issued in Chinese Patent Application No. 201480050580.3", dated Oct. 14, 2019, 7 Pages.

* cited by examiner

*Primary Examiner* — Natisha D Cox
(74) *Attorney, Agent, or Firm* — Ray Quinney & Nebeker, P.C.; Thomas M. Hardman; Sunah K. Lee

(57) ABSTRACT

In a network virtualization system, metadata is passed in an encapsulation header from one network virtualization edge to another network virtualization edge or to a service connected to a network virtualization edge. The metadata may carry packet processing instructions, diagnostic information, hop-specific information, or a packet identifier. Using the metadata information in the packet header, the datacenter network may provide services such as remote segmentation offload, small packet coalescing, transparent packet compression, and end-to-end packet tracing.

16 Claims, 7 Drawing Sheets

ENHANCED NETWORK VIRTUALIZATION USING METADATA IN ENCAPSULATION HEADER

CROSS-REFERENCE TO RELATED APPLICATION

This application is a continuation of U.S. patent application Ser. No. 14/026,759 filed on Sep. 13, 2013. The aforementioned application is expressly incorporated herein by reference in its entirety.

BACKGROUND

Server virtualization allows multiple virtual machines (VM) to run on a single physical server. Server virtualization allows users to move their servers to a cloud datacenter and to take advantage of the flexibility and scalability offered by running services on VMs. The IP addresses for existing virtual datacenters can make deployment of VMs labor intensive. Particularly, when the cloud service providers require users to change the IP addresses for services when the services are moved to the cloud environment. The IP address may have real semantic meaning to an enterprise. For example, network, security, compliance, and performance policies often incorporate and are dependent on the actual IP address of a given service. Moving a service to existing cloud providers requires rewriting of all these policies to take into account the new IP addresses for the services. This can be difficult because the policies may be spread among a number of different organizations that control those policies. Each time a user moves to a different cloud provider, the new service provider assigns a different set of IP addresses, which would require another policy rewrite. The current situation blocks many users and scenarios from adopting the cloud.

Network virtualization allows customer virtual machine networks to decouple from physical networks so that customers can bring their existing IP addresses and topologies into cloud datacenters. Network virtualization allows customers to keep the original IP address configuration of their network after the server is virtualized into the cloud. Servers continue to have the same IP address after being moved to the cloud datacenter.

Network virtualization may be achieved by assigning multiple IP addresses, such as a Customer Address and a Provider Address, to the virtual machines in the cloud datacenter. Using these IP addresses, traffic flows between an on-premise customer location and a customer's virtualized cloud server using the original IP addresses. Servers that are on-premise communicate with cloud servers using the original IP address and are unaware of the Provider Address, which is only exposed to a network virtualization edge, such as a virtual machine host. Network virtualization is accomplished by virtualizing the IP addresses and having an association with the provider address. The VM network packets are modified to include this association, thereby allowing multiple virtual networks with overlapping customer IP addresses to run on one physical network.

Network virtualization is a key technology to allow operation of a multi-tenant datacenter using software-based isolation. Network virtualization decouples the virtual networks for a tenant from the underlying physical network by sending tenant traffic in a tunneling protocol, such as network virtualization GRE (NVGRE) or Virtual Extensible LAN (VxLAN). However, current network virtualization solutions encode only minimal information in the tunneling protocol. As a result, the current solutions provide only basic packet forwarding and routing functionality. This limits the things that can be done with network virtualization and limits the efficiency of network virtualization implementation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments disclosed herein use metadata information in packet encapsulation headers to carry extra instructions or information that is used by a datacenter network. The datacenter endpoint or intermediate nodes perform additional processing on the packet based on the instructions or information indicated by the metadata. This improves the performance of network virtualization by making diagnosis of packet transport problems easier and making it easier to provide certain features that would otherwise be cumbersome to deploy in the datacenter.

In a network virtualization system, metadata may be passed in an encapsulation header from one network virtualization edge to another network virtualization edge or to a service connected to a network virtualization edge. Two network virtualization edges can negotiate support for handling the metadata. For example, the metadata may carry packet processing instructions, diagnostic information, hop-specific information, or a packet identifier. Using the metadata information in the packet header, the datacenter network may provide services such as remote segmentation offload, small packet coalescing, transparent packet compression, and end-to-end packet tracing.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In a traditional server virtualization, each individual physical host is converted to a virtual machine (VM) that runs on top of a common physical host. Each VM has the illusion that it is running on a dedicated piece of hardware, even though all resources, such as memory, CPU, and hardware peripherals, are actually shared. Network virtualization extends the concept of server virtualization to apply to entire tenant networks. With network virtualization, each physical network is converted to a virtual network that runs on top of a common physical network. Each virtual network has the illusion that it is running on a dedicated network, even though all resources, such as IP addresses, switching, and routing, are actually shared.

Figure 1:
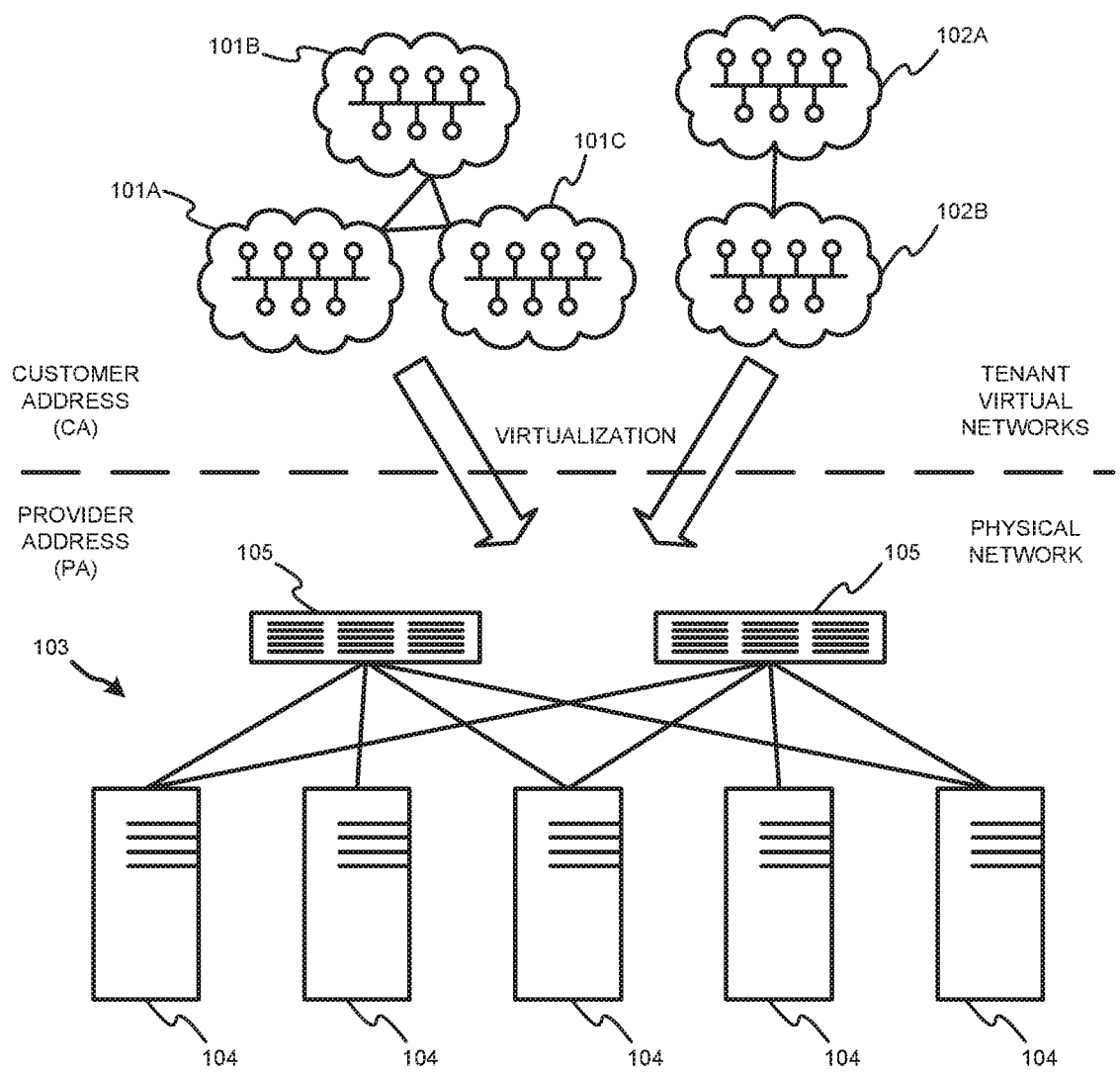
FIG. 1 illustrates a first tenant having a network with three subnets and a second tenant having a network with two subnets.

FIG. 1 illustrates a first tenant having a network with three subnets 101A-101C and a second tenant having a network with two subnets 102A-102B. These subnets 101, 102 run as virtual networks on physical network 103, which comprises a plurality of physical servers 104 interconnected by physical routers 105. Each virtual network 101, 102 has the illusion that it is running as an independent physical network with its own address space.

Network virtualization allows tenants to keep their own internal IP addresses when moving to the cloud while providing isolation from other tenant's VMs—even if those VMs happen to use the exact same IP addresses. This is accomplished by giving each VM two IP addresses. One IP address—the Customer Address (CA)—is visible in the VM and is relevant in the context of a given tenant's virtual subnet 101, 102. The other IP address—the Provider Address (PA)—is relevant in the context of the physical network 103 in the cloud datacenter. This decoupling of the tenant and datacenter IP addresses provides many benefits.

One benefit is that a tenant can move their network and subnets to VMs in the cloud without modifying the physical network configuration and without worrying about what other tenants or virtual networks are present in that datacenter. The tenant services will continue to work even if other tenants have the exact same IP address connected to the same virtual switch.

Another benefit is policy enforcement in the VM hosts, which provides a scalable solution for multi-tenant isolation. The network infrastructure does not need to be constructed to isolate tenants from each other. Existing networks often use VLANs for isolation. However, VLANs have scalability limitations and only support a limited number of tenants in a shared datacenter. Additionally, VLANs require the reconfiguration of switches every time a VM is brought up on a new server. In the network virtualization disclosed herein, there is no need to reconfigure the switches for each VM change, which increases the overall operational efficiency of running a datacenter.

A further benefit of network virtualization is that, by allowing tenants to preserve their IP addresses when moving to the cloud, the network virtualization also enables live migration across subnets. Live migration means that any client talking to a service is unaware that the VM hosting the service has moved from one physical host to a different physical host. Previously cross-subnet live migration was impossible because, by definition, if a VM moved from one subnet to a different subnet its IP address must change, which caused a service interruption. However, because each VM in the virtual network has two IP addresses, the IP address that is relevant in the datacenter context—i.e., the Physical Address—can be changed without needing to change the IP address that is in the VM—i.e., the Customer Address. Therefore, when a client is talking to the VM via the CA, the client is unaware that the VM has physically moved to a different subnet. Additionally, using distributed routing domains, the VM is unaware that its IP address has been virtualized. From the VM's perspective, all communication is occurring via the CA IP address.

An example system employing network virtualization is disclosed in pending U.S. patent application Ser. No. 13/603,281, entitled "Distributed Routing Domains in Multi-Tenant Datacenter Virtual Networks," the disclosure of which is hereby incorporated by reference herein in its entirety.

Figure 2:
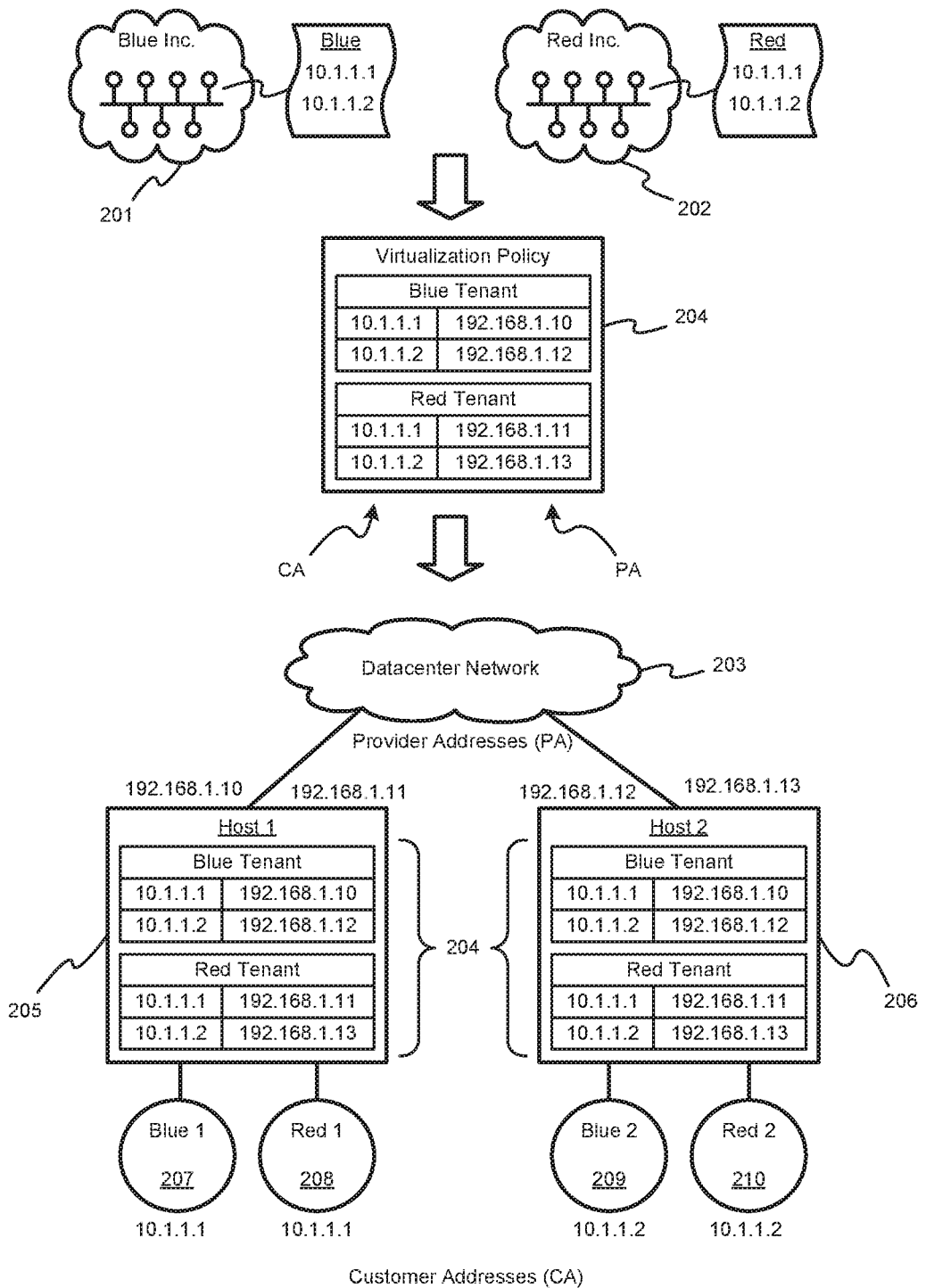
FIG. 2 illustrates an example network virtualization scenario according to one embodiment.

FIG. 2 illustrates an example network virtualization scenario according to one embodiment. Blue Inc. has its own network 201 that uses IP addresses 10.1.1.1 and 10.1.1.2 (i.e., the Blue CAs). Similarly, company Red Inc. also has its own network 202, which also uses IP addresses 10.1.1.1 and 10.1.1.2 (i.e., the Red CAs). If both companies want to virtualize their respective networks 201, 202 on datacenter network 203, there will be an addressing problem due to the overlapping CA space. However, using a network virtualization policy 204, the customer addresses for tenants Blue and Red can be mapped to the physical address space of the host machines that will host the tenants' services.

Host machine 205 and host machine 206 both have a copy of the network virtualization policy 204, which the host machines use for routing packets to the respective VMs 207-210. Host machine 205 uses PA 192.168.1.10 and 192.168.1.11 and host machine 206 uses PA 192.168.1.12 and 192.168.1.13 to communicate with other hosts, routers, and devices on the physical network. If any changes occur for the VMs, such as migration of a VM to a different host, the network virtualization policy should be updated immediately for all host machines.

The virtual network routers can be used to build a hierarchy of routers that are distributed among the host machines so that no physical routers are needed to route packets on a virtual network. The IP address of the VMs or services is no longer a limiting factor. The IP address can stay with the service or VMs and can be moved to any host. The network virtualization policy is used to route packets to the current location of the destination service. The services for one customer can be distributed to different physical locations, but still keep their addresses.

On the other hand, host machines 205 and 206 use CA 10.1.1.1 and 10.1.1.2 to communicate with their hosted VMs. VM 207 is used for services directed to IP address 10.1.1.1 on Blue network 201. On the same host machine 205, VM 208 is used for services directed to CA 10.1.1.1 on the Red network 202. VM 209 is used for services directed to CA 10.1.1.2 on Blue network 201. On the same host machine 206, VM 210 is assigned to service directed to CA 10.1.1.2 on the Red network 202.

IP packets received by datacenter network 203, host 205 or host 206 are routed to the appropriate VM using virtualization policy map 204. For example, when host 205 receives an IP packet addressed to Blue 10.1.1.2 from Blue 1 VM in VM 207, it looks on policy map 204 and determines that the corresponding VM is found at a machine having PA 192.168.1.12. Host 205 encapsulates the IP packet with a destination address of 192.168.1.12 and sends the encapsulated packet to datacenter network 203, which uses the PA 192.168.1.12 to forward the packet to host 206. Host 206 then strips off the encapsulation, identifies the packet as directed to the Blue network CA space. Using policy map 204, host 206 identifies VM 209 as corresponding to CA 10.1.1.2 on the Blue network.

Figure 3:
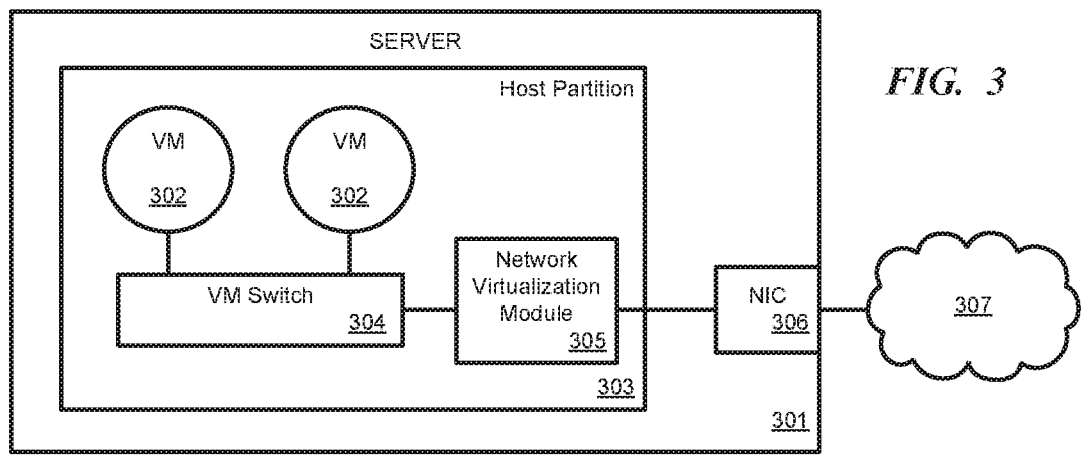
FIG. 3 illustrates a server used in a host datacenter according to one embodiment.

FIG. 3 illustrates a server used in a host datacenter according to one embodiment. Server or computer system 301 hosts a plurality of VMs 302 on host partition 303. VMs 302 communicate with each other or with remote devices and via a VM Switch 304.

In one embodiment, Generic Routing Encapsulation (GRE) is used for tenant address virtualization. GRE encapsulation—like any other encapsulation—requires an entity that maps and encapsulates a tenant IP address (i.e., CA) to an IP address in the provider address (PA) space. Mapping CA/PA and creating the appropriate GRE header may be performed by a software agent, such as network virtualization module 305, running in the host partition of host server 301. In one embodiment, the network virtualization module 305 may use NVGRE. Outbound VM traffic is processed by network virtualization module 305 and all frames are encapsulated with appropriate encapsulation header before transmission to network interface card (NIC) 306 and over the network 307. Similarly all inbound VM traffic from network 307 is processed by network virtualization module 305 and—after identifying and verifying the tenant and removing the encapsulation header—is sent to the appropriate destination VM 302. The network virtualization module 305 may be a software agent running on server 301. Network virtualization module 305 may act like a physical router so that the network virtualization is transparent to the VMs 302.

Using this integrated routing functionality, the host server can make a direct forwarding decision based on virtual network policies to determine whether the destination subnet is within the same routing domain (RDID) or virtual subnet (VSID). Packets can be delivered directly from the source host to the destination host without going through a separate virtual router on the datacenter network. The network virtualization module acts internally as a distributed router to make forwarding decisions just like a real router does in physical or virtual form. This distributed router functionality is utilized to support the multi-subnet topologies described below.

Using the encapsulation forwarding functionality, there is no need for a gateway or appliance to route virtual network VM-to-VM traffic. However, a gateway is still used to route traffic between virtual network VMs and non-virtual network systems. The network virtualization module is provisioned with all of the CA-PA mapping records for all VMs in all subnets of the customer so that it can forward packets on its own.

Figure 4:
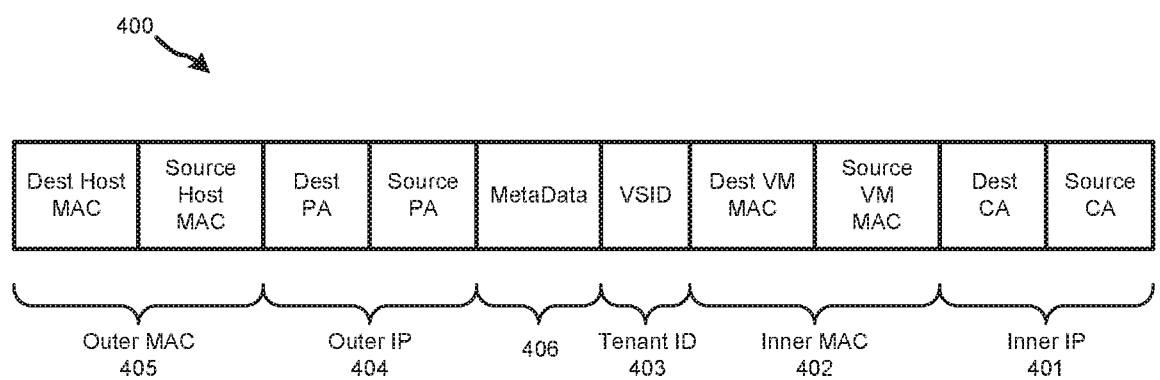
FIG. 4 illustrates an encapsulated packet header using the customer address, provider access, and MAC addresses of the virtual machines and hosts.

FIG. 4 illustrates an example encapsulated packet header 400 using the CA, PA and MAC addresses of the VMs and Hosts. In one embodiment, the GRE protocol is used for encapsulation. However, any suitable encapsulation protocol may be used that allows tenant VM information, such as a VSID, VM MAC address, and CA to be transmitted in a packet. A network virtualization module performs encapsulation and decapsulation in one embodiment.

Inner IP 401 includes the destination and source CA for the tenant's services. Inner MAC 402 includes the destination and source MAC addresses for the VMs running the tenant's services. Tenant ID 403 includes a virtual subnet identifier for the tenant. Although different tenants may use the same IP addresses (i.e., CAs) on their networks, the combination of Tenant ID 403 and Inner IP 401 uniquely identify services in different tenant virtual networks.

The Outer IP 404 and Outer MAC 405 are added by the network virtualization module during encapsulation. Outer IP 404 and Outer MAC 405 are in a format appropriate for the encapsulation protocol used in the datacenter, such as GRE.

The network virtualization modules may add metadata information 406 to the packet encapsulation header to carry extra instructions or additional information about the packet. Using metadata 406, the datacenter devices, such as endpoint hosts and network servers, routers, switches and intermediate security devices, may do extra processing on the packet based on the instructions or information indicted by the metadata. The metadata 406 provides an improved network virtualization solution that allows the datacenter to introduce features that would otherwise be cumbersome to build and deploy.

In one embodiment, the metadata 406 is passed in the encapsulation header from one network virtualization edge to another network virtualization edge or to a service connected to a network virtualization edge. The network virtualization edges can negotiate support for handling the metadata 406. The metadata 406 may also be passed in an encapsulation header from a service connected to a network virtualization edge to another network virtualization edge or to another service connected to a network virtualization edge. The service may be, for example, a VM connected to the network virtualization edge.

The metadata 406 may carry, for example, packet-processing instructions, diagnostic information, and/or hop-specific information for the packet routing path. The addition of the metadata 406, such as the delivery of hop-specific information, may be handled by the network virtualization modules in one embodiment.

Although the metadata is shown as occupying a designated location 406 in example encapsulation header 400, it will be understood that the metadata may occupy any one or more locations within the encapsulation header. The location selected to carry the metadata may vary based on the type of encapsulation protocol being used. For example, the header for the selected encapsulation protocol may include "reserved" fields that are either undefined or designated for features not used within the datacenter. The metadata may be added to such reserved fields in one embodiment. In other embodiments, other fields within the encapsulation header that are for features not used within the datacenter may be used to carry metadata. The datacenter will understand that a particular field carries metadata instead of standard encapsulation data.

Figure 5:
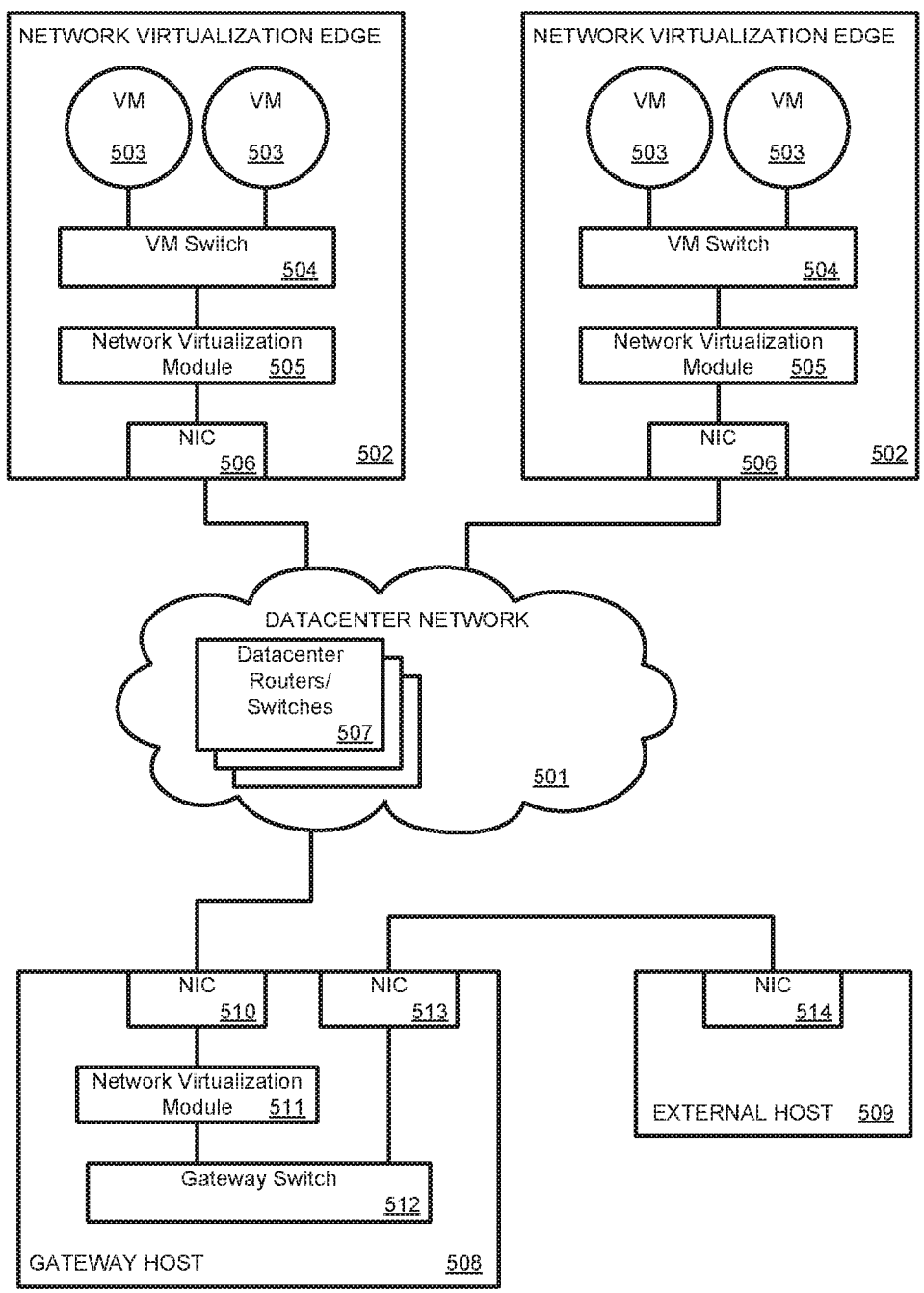
FIG. 5 illustrates a hybrid network in which customer services are deployed in on VMs in a virtual network run on datacenter network.

FIG. 5 illustrates a hybrid network in which customer services are deployed on VMs in a virtual network run on datacenter network 501. Datacenter 501 has a plurality of network virtualization edge components 502, which may be VM host machines or servers, that support numerous VMs 503. Services for many virtual subnets may be deployed on VMs 503 that are spread across several network virtualization edge components 502.

VMs 503 communicate with each other or with remote devices via a VM Switch 504. A virtual network router 505, such as a NVGRE router, on each network virtualization edge 502 encapsulates packets that are forwarded among the VMs 503 on different hosts. The network virtualization modules follow a network virtualization policy that defines mappings between a tenant CA space and the PA space on the datacenter network 501. Packets are routed among the VMs using the network virtualization policy. Network virtualization modules 505 operate as distributed routers that support a multiple-VM network topology that is indexed by both RDID and VSID.

VM traffic is processed by network virtualization module 505 and encapsulated with appropriate encapsulation header before transmission to network interface card (NIC) 506 for transmission over datacenter network 501. A number of datacenter servers, routers, switches, and intermediate security devices 507 in network 501 route packets between a network virtualization edge 502 and other devices, such as datacenter gateway host 508. Network virtualization modules 505 may add metadata to the encapsulated packets that are routed in the datacenter. The metadata may be used by other network virtualization modules and network servers, switches, routers, intermediate security devices and other nodes to determine how to handle the packets.

Gateway host 508 may be a network virtualization edge server. Gateway host 508 provides an interface to external hosts 509 on networks outside the datacenter, such as the Internet. Packets that are not addressed to any of the virtual networks or VMs in the datacenter are routed to gateway host 508 for processing. All off-network traffic goes through gateway 508, which has all of the virtual network policy information so that it can route packets to the correct network virtualization edge 502 and VM or to the correct external entity 509. If a VM 503 sends a packet to a destination IP address that is not known to its network virtualization edge 502 and/or there is no entry for the destination IP address in the virtual network policy, then that packet is forwarded to gateway 508 by default for further routing.

Packets are received at gateway 508 from network 501 at NIC 510. The packets are forwarded to network virtualization module 511, which unencapsulates them before sending them to gateway switch 512. The packets are then forwarded to the appropriate NIC 513 to be sent to NIC 514 on destination host 509.

Using encapsulation, network virtualization modules 505, 511 can forward packets between VMs on a network virtualization edge 502 and devices on external network 509. For example, a VM 503 can generate a packet to send to external host 509 without knowing that destination is on an external network. The VM switch 504 on network virtualization edge 502 will send the packet to network virtualization module 505, which will reference the virtualization policy and determine that the packet should be routed using the MAC address of gateway 508 to reach the ultimate destination on external host 509. Network virtualization module 505 will encapsulate the packet by adding outer headers for routing the packet to gateway 508.

The inclusion of metadata in the datacenter's network virtualization packets allows the datacenter to provide numerous additional features to customers, such as remote segmentation offload, small packet coalescing, transparent packet compression, and end-to-end packet tracing. Additionally, the metadata may be used by the datacenter to provide packet-handling/Quality of Service (QoS) instructions and to support network diagnostics.

Remote Segmentation Offload

Referring to the example datacenter illustrated in FIG. 5, the traffic from VMs 503 to an external host 509 flows through gateway host 508. When a TCP connection is established between a VM 503 and external host 509, a maximum segment size (MSS) is negotiated for the connection. This size is based on the local maximum transmission unit (MTU). For example, a TCP MSS of 1418 bytes may be negotiated as they payload size between the VM 503 and the external host 509. Accordingly, in a typical network, after adding the MAC header, IP header, and TCP header, any packets sent to the external host 509 from the VM 503 would be limited to 1514 bytes.

Figure 6:
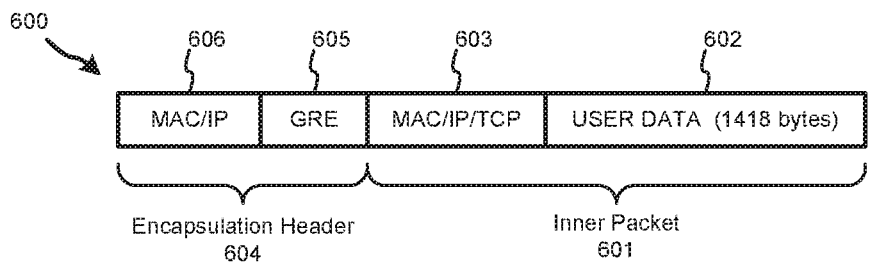
FIG. 6 illustrates a packet used to carry data between a VM and a destination host using encapsulation tunnel header.

FIG. 6 illustrates a 1514 byte packet 600. The inner packet 601 generated by the VM comprises a maximum 1418-byte user-data portion 602 and an inner header 603 that includes address and routing information for the VM's virtual network. A network virtualization module 505 encapsulates the inner packet 601 by adding the appropriate encapsulation header 604, which may include encapsulation-specific data 605, such as GRE fields, and outer address and routing data 606 for the datacenter's physical network.

In this configuration, if the VM sends a large TCP packet exceeding the link MTU, such as an 8000-byte size packet, to the external host, the packet would be segmented by the network virtualization module (NVE) in software or using NIC offload called large send offload (LSO) into packets that have TCP payload size equal to the MSS size and then add an encapsulation header ensuring total size is 1514 or less per packet.

Figure 7:
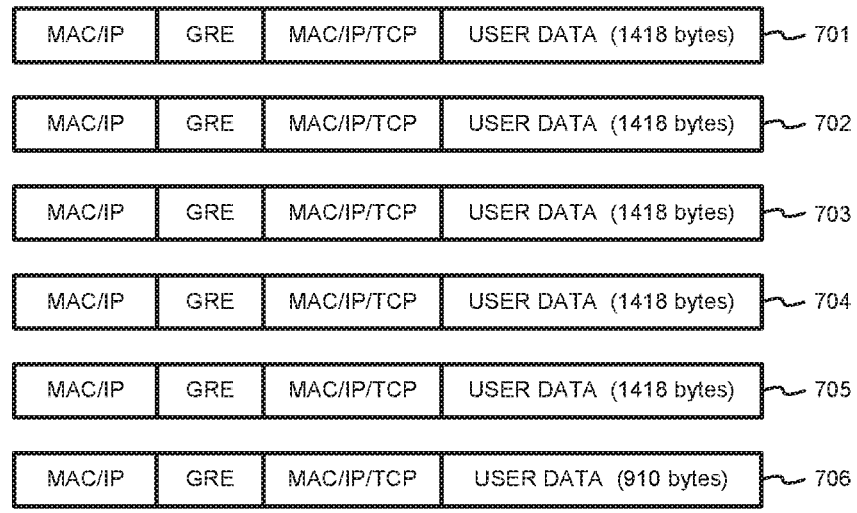
FIG. 7 illustrates segmentation of a large-byte packet as might occur in an existing datacenter network.

FIG. 7 illustrates segmentation of an 8000 byte packet as might occur in an existing datacenter network. A plurality of encapsulation packets 701-706 could be created by a network virtualization module 505 from the VM's 8000-byte packet. This segmentation is performed in order to maintain the negotiated MSS for the TCP connection, which is based on the VM's MTU of 1514 bytes from gateway host 508 to the external host 509. However, this segmentation is inefficient because it does not take advantage of the larger MTU size that is available within the datacenter's own network 501 between VM 503 and gateway host 508.

Segmentation at network virtualization edge 502 would result in the sending of multiple packets 701-706 on the datacenter network 501. Each packet 701-706 would have separate encapsulation tunnel header 604. This excess overhead reduces the efficiency of the datacenter network even further.

Using remote segmentation offload, the network virtualization module can detect that a packet is being sent from a VM to a destination host, such as external host 509, via a gateway host 508. In some embodiments, the gateway host 508 may be a VM. The network virtualization module is aware that there is larger MTU (i.e., at least 8000-byte MTU) available on the datacenter network 501 between the VM and gateway host 508. Accordingly, rather than sending a string of packets 701-706 across the datacenter network 501, the network virtualization module sends a single large packet to the gateway host without any segmentation.

Figure 8:
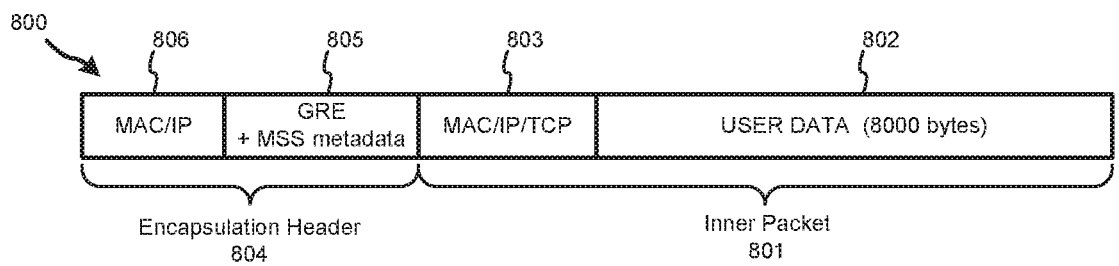
FIG. 8 illustrates an encapsulation packet that is used to carry a large inner packet comprising a large user data segment and a single inner header.

FIG. 8 illustrates an encapsulation packet 800 that is used to carry the large inner packet 801 comprising an 8000-byte user data segment 802 and a single inner header 803. Encapsulation header 804 includes encapsulation-specific data 805, such as GRE information, and outer address and routing data 806 for the datacenter's physical network. The encapsulation-specific data 805 includes MSS metadata that is used by the gateway host 508 to determine what MSS should be used for packets sent on the TCP connection to the destination external host 509.

Using this remote segmentation offload process, the datacenter saves bandwidth and processing time by avoiding the need to segment the VM packet within the datacenter itself. Host gateway 508 is unaware of the MSS that is negotiated between the VM 503 and the external host 509, so that information is passed as metadata in the encapsulation header. This reduces network overhead because only one encapsulation tunnel header 804 is needed instead of six encapsulation tunnel headers 604 if the packet had to be divided into packets 701-706. This also requires the gateway host 508 to process only one packet 800 instead of six packets 701-706, thereby improving the software efficiency of the gateway host 508.

Gateway host 508 uses the MSS metadata from the encapsulation header to determine the appropriate packet size (i.e., 1514 bytes) for the packets to be sent to the destination external host 509. The final segmentation of packet 800 can be performed in software by the gateway host 508 or performed by the physical NIC 513 using NIC offload called large segment offload (LSO). After doing its processing, the gateway host 508 sends the packets to the external host 509.

In other embodiments, a large packet may be routed from one VM to another VM in the datacenter. The network virtualization module may break up the large packet into any size packet that is appropriate. For example, if a VM sends a 16,000-byte packet, the network virtualization module may divide it into two 8000-byte packets for transmission over the datacenter network. The two 8000-byte packets may be further divided up at a datacenter network edge device into smaller packets for transmission to an external destination.

Small Packet Coalescing

While the remote segmentation offload process recognizes the benefit of not breaking up large packets into many smaller segments, the small packet coalescing process takes a similar approach by combining individual packets into one larger packet. For example, if a VM 503 sends multiple small packets to another VM 503 or to gateway host 508, the network virtualization module 505 can combine two or more packets that are directed to the same network virtualization edge into a single encapsulation tunnel packet. This improves datacenter efficiency because the network has to process less packets and the overall number of bytes on the network is reduced by eliminating the need for separate encapsulation headers on each small packet.

Figure 9:
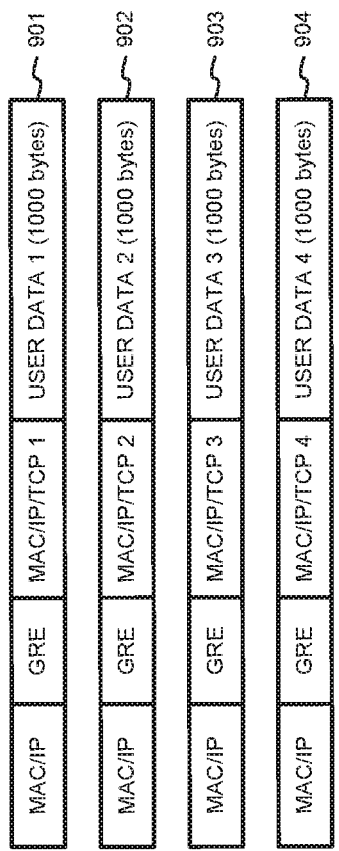
FIG. 9 illustrates four packets that are sent individually by a VM to a destination on the datacenter network.

FIG. 9 illustrates four packets 901-904 that are sent by a VM 503 to a destination on the datacenter network, such as another VM 503 or gateway host 508. The packets 901-904 are encapsulated using GRE, for example. It will be understood that any encapsulation protocol may be used for the packets to support virtual networks in a datacenter. If the VM 503 sends the four 1000-byte payload packets 901-904 individually, then each packet will require a separate encapsulation header. Additionally, the datacenter network components will have to process and route each packet separately.

Figure 10:
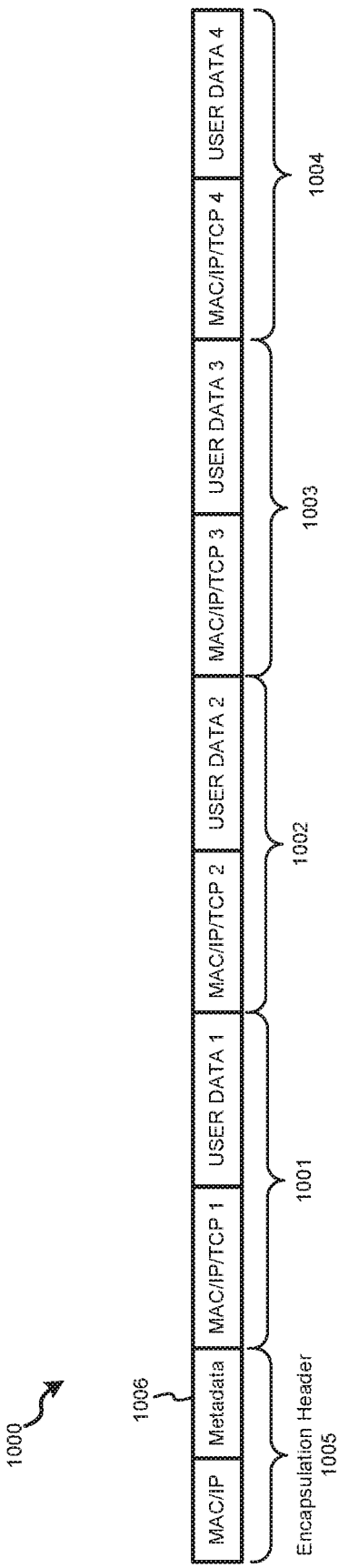
FIG. 10 illustrates a single packet that has been created by the network virtualization module from four separate packets.

Sending these four packets individually is inefficient. However, using packet coalescing with encapsulation metadata, a single tunnel packet can be created to combine all four packets. FIG. 10 illustrates a single encapsulated packet 1000 that has been created by the network virtualization module from four separate packets. The packet 1000 may be encapsulated using GRE or any other encapsulation protocol. The inner header and user-data payload for each packet occupies its own segment 1001-1004. A single encapsulation header 1005 is used for all four packets. The encapsulation header includes metadata 1006 that identifies where each segment 1001-1004 begins and ends. For example, the metadata may indicate the number of packets and an array of inner-packet offsets from the beginning of the packet. Packet 1000 may be sent through the network to a destination device. The destination device receives the packet and extracts the encapsulation header metadata 1006 to identify the number of coalesced packets and packet boundaries. For example, the metadata 1006 may identify sub-packet boundaries as offsets from the beginning of packet 1000. The receiver network virtualization module uses this metadata information to split the large packet 1000 into the original smaller packets for delivery to local VMs.

The small packet coalescing solution provides the advantage of sending only one encapsulated tunnel packet that combines multiple VM packets. This reduces overhead on the datacenter network. The small packet coalescing is also useful for packets that are being routed to destinations outside the datacenter because a gateway host can process multiple packets in a batch instead of processing one packet at a time, thereby reducing software overhead on the host.

Packet Compression

If a VM sends a large packet, the network virtualization module can compress the packet as part of the encapsulation process to reduce the size of the packet that is sent over the datacenter network. Metadata in the encapsulation header may be used to specify that compression has been used and to identify the type of compression.

Compression can also be used when multiple VM packets are combined into a one packet for transmission on the datacenter network. For example, in the example of FIGS. 9 and 10, the user data 1-4 in packets 901-904 may be compressed before the packets are combined into large packet 1000. In addition to identifying sub-packet 1001-1004 boundaries in packet 1000, the metadata 1006 may indicate that compression was used in the packet and specify the compression algorithm that was used. A receiving network virtualization module uses the metadata to decompress the VM packets before delivering them to their destination. This compression may be transparent to the VMs since it is performed after the source VM sends the packet and before the destination VM receives the packet. Such compression may result in improved network utilization at the cost of higher procession requirements at the network virtualization module, but may be useful in bandwidth-constrained networks.

End-to-End Packet Tracing

In a datacenter with network virtualization, a packet may traverse a source VM, a source VM switch, a source network virtualization module, and a NIC all within the source host server. The packet then typically traverses several physical routers, switches, or other nodes within the data center network before arriving at a destination network virtualization edge, such as another host server or host gateway. The packet may further traverse a NIC, destination network virtualization module, and destination VM switch before arriving at a destination VM. The packet may also originate outside the datacenter network for routing to a VM via a network virtualization edges or host gateway. The packet may be tracked through the datacenter network using encapsulation header metadata.

Figure 11:
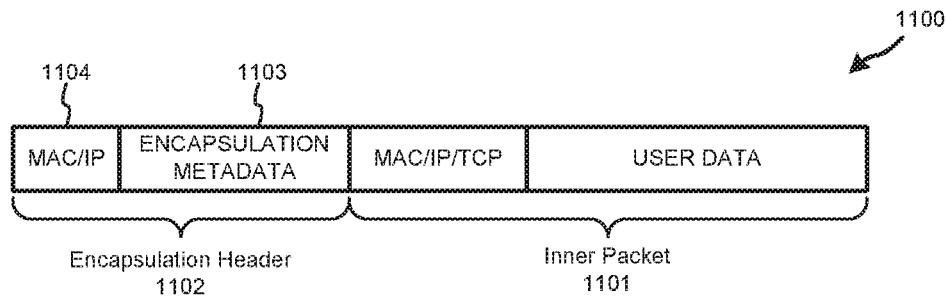
FIG. 11 illustrates an encapsulated tunnel packet with encapsulation header metadata that is used to carry an inner packet through a datacenter network.

FIG. 11 illustrates an encapsulated tunnel packet 1100 that is used to carry inner packet 1101 through a datacenter network. A network virtualization module encapsulates the inner packet 1101 by adding the appropriate encapsulation header 1102, which may include encapsulation-specific data 1103, such as GRE fields and metadata, and outer address and routing data 1104 for the datacenter's physical network. The encapsulation metadata 1103 may be used to trace packet 1100 as it traverses datacenter nodes.

The encapsulation metadata may function as a unique identifier that is transferred onto tracing events at each device it traverses within the datacenter network and/or at each layer in the network stack. This unique metadata tag may also passed from the VM to the network virtualization module and then to the NIC. This allows for tracing the packet all the way from an application on the VM to a network interface card.

A network virtualization module may add the unique identifier as metadata to the encapsulation header, which may also include diagnostic events for processing of the packet. Network virtualization modules that handle the packet extract the identifier from the encapsulation header and log diagnostic events for packet processing. The unique identifier may be sent to the destination VM where the network stack may use the same identifier instead of generating a separate identifier. In this manner, events for a particular packet can have the same identifier within the VM and on the datacenter network for unified diagnosis of packet drops or other issues.

For example, the metadata may add a protocol-agnostic context that can be used by multiple software layers and by intermediate transit devices. This tracing context may be transferred across the datacenter network even if packets in a network flow are terminated at a network virtualization edge device or gateway and then included in another flow leaving that device or gateway. Additionally, the same tracing context can be used by a plurality of packets in the datacenter network.

Diagnostic Packets

The encapsulation header metadata may be used to mark the packet as a special diagnostics packet. When the intermediate network nodes, such as datacenter servers, switches, routers, intermediate security devices, and other nodes, and the network virtualization edge devices observe the diagnostic packet, the devices may log detailed diagnostics information. This would allow a datacenter operator to run diagnostics on certain type of packets, such as ping packets or TCP SYN packets.

Quality of Service (QoS)

In another embodiment, the encapsulation header metadata may trigger other events, such as special handling of the packet. For example, the encapsulation header metadata may direct an intermediate network device, such as a network router, switch or other node, how to handle the packet. The encapsulation header metadata may identify the priority or bandwidth requirements for the packet. When the network device observes the encapsulation header metadata, it will prioritize or throttle the packets to meet the QoS requirements. Using the encapsulation header metadata, the datacenter network may prioritize traffic for latency-sensitive applications, such as voice or video packets, and control the impact of latency-insensitive traffic, such as packets used for bulk data transfers.

In other embodiments, the metadata may indicate that a packet should receive special treatment by an intermediate device. For example, the metadata may indicate that the packets should undergo detailed analysis by a security device. Similarly, the metadata may indicate that such analysis has already occurred. For example, a security device may mark a particular packet with metadata that indicates that the packet has already been processed by a security device. Such metadata may indicate that the packet is safe for transit (i.e., has already been analyzed) or originates from a trusted or untrusted source.

Hop-Specific Information

The encapsulation header metadata may be used to provide hop-specific information for the packet routing. For example, the encapsulation metadata may indicate that the packet should be routed through certain paths or may specify how certain devices should handle the packet. This would allow the datacenter to specify that a particular router/switch should handle the packet in one manner and/or that another router/switch should handle the same packet in a different manner. Each node in the network may map the encapsulation header metadata to a specific set of parameters that the node will apply to the packet.

Figure 12:
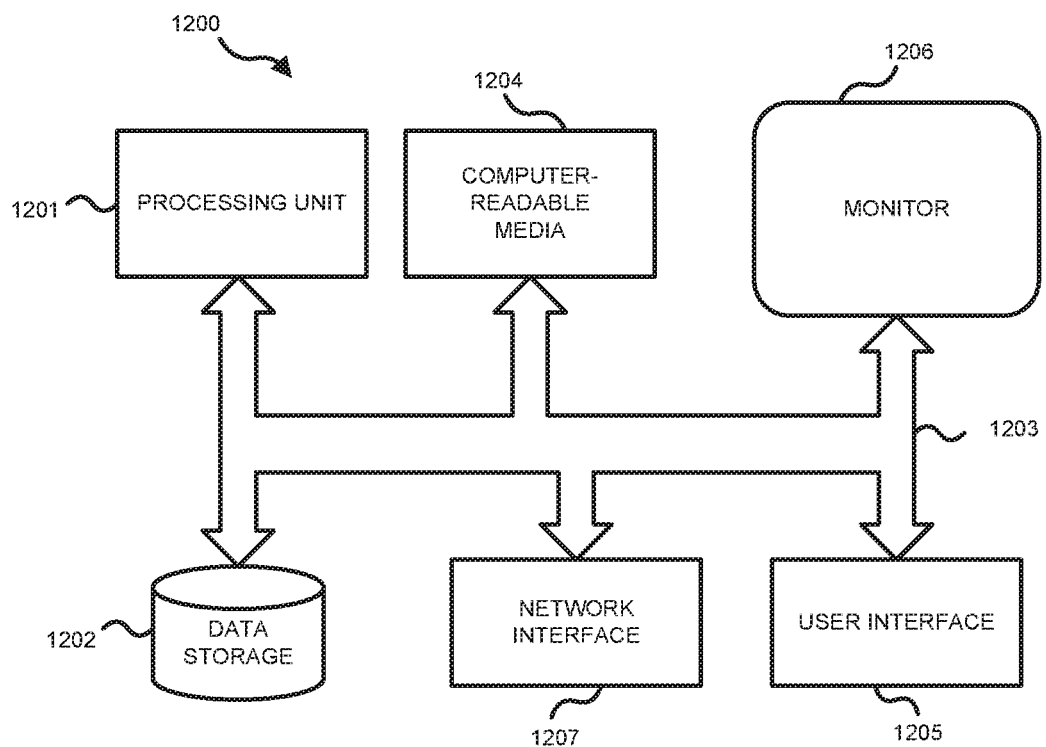
FIG. 12 illustrates an example of a suitable computing and networking environment.

FIG. 12 illustrates an example of a suitable computing and networking environment 1200 on which the examples of FIGS. 1-11 may be implemented. The computing system environment 1200 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 12, an exemplary system for implementing various aspects of the invention may include a general purpose computing device in the form of a computer 1200. Components may include, but are not limited to, various hardware components, such as processing unit 1201, data storage 1202, such as a system memory, and system bus 1203 that couples various system components including the data storage 1202 to the processing unit 1201. The system bus 1203 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1200 typically includes a variety of computer-readable media 1204. Computer-readable media 1204 may be any available media that can be accessed by the computer 1200 and includes both volatile and nonvolatile media, and removable and non-removable media, but excludes propagated signals. By way of example, and not limitation, computer-readable media 1204 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1200. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 1202 includes computer storage media in the form of volatile and/or nonvolatile memory such as read only memory (ROM) and random access memory (RAM). A basic input/output system (BIOS), containing the basic routines that help to transfer information between elements within computer 1200, such as during start-up, is typically stored in ROM. RAM typically contains data and/or program modules that are immediately accessible to and/or presently being operated on by processing unit 1201. By way of example, and not limitation, data storage 1202 holds an operating system, application programs, and other program modules and program data.

Data storage 1202 may also include other removable/non-removable, volatile/nonvolatile computer storage media. By way of example only, data storage 1202 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 12, provide storage of computer-readable instructions, data structures, program modules and other data for the computer 1200.

A user may enter commands and information through a user interface 1205 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 1201 through a user input interface 1205 that is coupled to the system bus 1203, but may be connected by other interface and bus structures, such as a parallel port, game port or a universal serial bus (USB). A monitor 1206 or other type of display device is also connected to the system bus 1203 via an interface, such as a video interface. The monitor 1206 may also be integrated with a touch-screen panel or the like. Note that the monitor and/or touch screen panel can be physically coupled to a housing in which the computing device 1200 is incorporated, such as in a tablet-type personal computer. In addition, computers such as the computing device 1200 may also include other peripheral output devices such as speakers and printer, which may be connected through an output peripheral interface or the like.

The computer 1200 may operate in a networked or cloud-computing environment using logical connections 1207 to one or more remote devices, such as a remote computer. The remote computer may be a personal computer, a server, a router, a switch, a network PC, a peer device or other common network node, and typically includes many or all of the elements described above relative to the computer 1200. The logical connections depicted in FIG. 12 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 1200 may be connected to a public or private network through a network interface or adapter 1207. In some embodiments, a modem or other means for establishing communications over the network. The modem, which may be internal or external, may be connected to the system bus 1203 via the network interface 1207 or other appropriate mechanism. A wireless networking component such as comprising an interface and antenna may be coupled through a suitable device such as an access point or peer computer to a network. In a networked environment, program modules depicted relative to the computer 1200, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing packets in a datacenter network, comprising:
   receiving, at a node in the datacenter network, an encapsulated packet comprising metadata in an encapsulation header, wherein the metadata comprises packet processing instructions, and wherein the node comprises a network virtualization edge;
   extracting the metadata from the encapsulation header;
   negotiating support for handling the metadata with another network virtualization edge; and
   processing the encapsulated packet based upon the packet processing instructions in the metadata.

2. The method of claim 1, wherein the node comprises a gateway to a network external to the datacenter network.

3. The method of claim 1, wherein the metadata is carried in a reserved field of the encapsulation header.

4. The method of claim 1, wherein the metadata is carried in a field of the encapsulation header that is designated for encapsulation information that is not used by the datacenter network.

5. The method of claim 1, wherein the metadata additionally comprises at least one of diagnostic information, hop-specific information, or a packet identifier in addition to the packet processing instructions.

6. The method of claim 1, further comprising using the metadata to provide at least one of remote segmentation offload, small packet coalescing, packet compression, or end-to-end tracing.

7. A computer-readable medium having computer-executable instructions stored thereon that, when executed, cause one or more processors to:
   receive, at a node in a datacenter network, an encapsulated packet comprising metadata in an encapsulation header, wherein the metadata comprises packet processing instructions, and wherein the node comprises a network virtualization edge;
   extract the metadata from the encapsulation header;
   negotiate support for handling the metadata with another network virtualization edge; and
   process the encapsulated packet based upon the packet processing instructions in the metadata.

8. The computer-readable medium of claim 7, wherein the node comprises a gateway to a network external to the datacenter network.

9. The computer-readable medium of claim 7, wherein the metadata is carried in a reserved field of the encapsulation header.

10. The computer-readable medium of claim 7, wherein the metadata is carried in a field of the encapsulation header that is designated for encapsulation information that is not used by the datacenter network.

11. The computer-readable medium of claim 7, wherein the metadata additionally comprises at least one of diagnostic information, hop-specific information, or a packet identifier in addition to the packet processing instructions.

12. The computer-readable medium of claim 7, further comprising instructions that are executable by the one or more processors to use the metadata to provide at least one of remote segmentation offload, small packet coalescing, packet compression, or end-to-end tracing.

13. A method for processing packets in a datacenter network, comprising:
   receiving a packet at a network virtualization module, wherein the packet is addressed to a virtual address on the datacenter network, and wherein a network virtualization edge comprises the network virtualization module;
   creating an encapsulated packet from the packet, wherein the encapsulated packet is addressed to a physical address on the datacenter network, wherein the encapsulated packet comprises an encapsulation header having metadata that is not defined by an associated encapsulation protocol, and wherein the metadata comprises packet processing instructions; and
   negotiating support for handling the metadata with another network virtualization edge.

14. The method of claim 13, wherein the metadata is carried in a reserved field of the encapsulation header.

15. The method of claim 13, wherein the metadata is carried in a field of the encapsulation header that is designated for encapsulation information that is not used by the datacenter network.

16. The method of claim 13, wherein the metadata additionally comprises at least one of diagnostic information, hop-specific information, or a packet identifier in addition to the packet processing instructions.

* * * * *